July 30, 1946.   H. C. GRANT, JR., ET AL   2,404,796
FLUID PRESSURE CONTROL DEVICE
Filed Oct. 1, 1942

INVENTORS
Harry C. Grant, Jr.
BY William A. V. Thomsen
J. William Carson
ATTORNEY Patented July 30, 1946

2,404,796

UNITED STATES PATENT OFFICE 2,404,796

FLUID PRESSURE CONTROL DEVICE

Harry C. Grant, Jr., New York, N. Y., and William A. V. Thomsen, Glen Ridge, N. J., assignors to Specialties Development Corporation, Bloomfield, N. J., a corporation of New Jersey Application October 1, 1942, Serial No. 460,350

1 Claim. (Cl. 121—46.5)

This invention relates to a fluid pressure operable device, and more particularly to a control device for use in connection with a source of fluid medium under pressure and a servo-motor, or similar pressure operable devices.

An object of the present invention is to provide a control device which is adapted to control the admission of fluid pressure medium to a fluid pressure operable device.

Another object is to provide a control device which is adapted to quickly relieve the fluid pressure from the pressure operable device.

Another object is to operate the control device chiefly by the pressure of the controlled fluid medium.

A further object is to provide a control device adapted to accomplish the foregoing objects in a simple and expeditious manner.

Other and further objects of the invention will be obvious upon an understanding of the illustrative embodiment about to be described, or will be indicated in the appended claim, and various advantages not referred to herein will occur to one skilled in the art upon employment of the invention in practice.

A preferred embodiment of the invention has been chosen for purposes of illustration and description and is shown in the accompanying drawing, forming a part of the specification, wherein.

Figure 1:
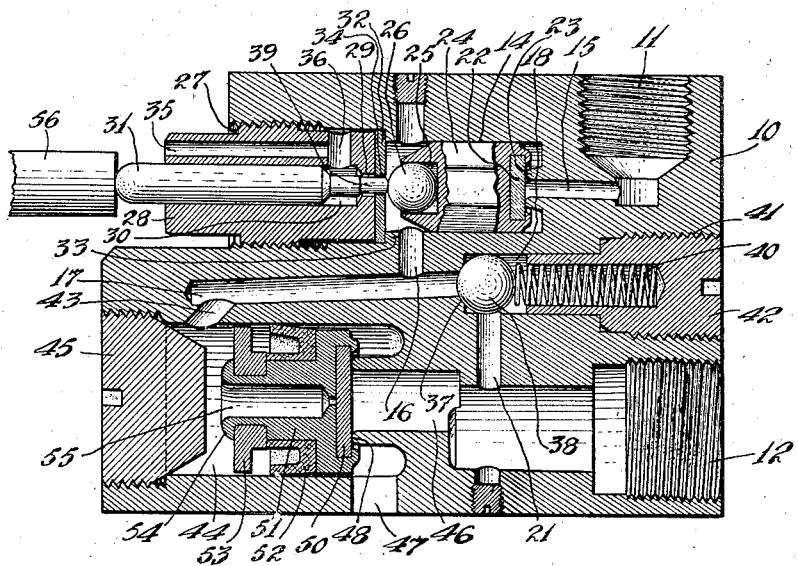
Figure 1 is a sectional elevational view of a control device.
Figure 2:
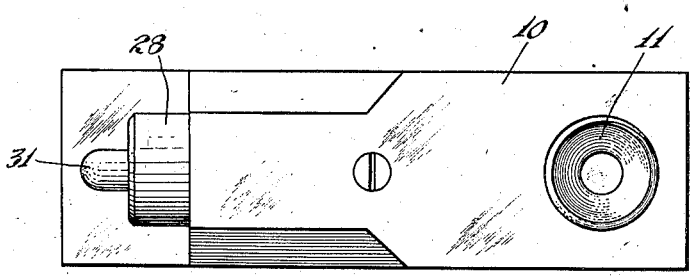
Figure 2 is a top plan view of the device.

Referring now to the drawing, the control device, shown, comprises a body 10 having an inlet port 11 and an outlet or manifold port 12, to which conduits may be secured for connecting the device to a source of fluid pressure medium, such as a container storing carbon dioxide under pressure, and to a fluid pressure operable device, such as a servo-motor, respectively. The conduits are not shown in the drawing.

The inlet port 11 is in fluid flow communication with a valve chamber 14 by way of a passage 15 in the body 10. Fluid flow communication is also provided from the valve chamber 14 to the outlet port 12 by way of a vertical passage 16 which forms a T-connection with a substantially horizontal passage 17. The passage 17, at one end thereof, communicates with a second valve chamber 18, and the valve chamber 18, in turn, communicates with the outlet port or manifold 12 through a vertical passage 21.

Communication between the passage 15 and the valve chamber 14 is controlled by an inlet valve 22 which is adapted to cooperate with a valve seat 23 provided in the body 10 between the valve chamber 14 and the passage 15. The valve 22 has a body portion 24 which is formed with a recess 25 wherein is disposed a ball valve 26 adapted to snugly fit into but still freely move within the recess. The body portion 24 of the valve 22 is dimensioned to have a sliding fit with respect to the valve chamber 14, and, in order to permit fluid medium to pass from the inlet port toward the passage 16 and beyond, is provided with a hexagonal contour, or flutings, or the like.

Adjacent the valve chamber 14, the body 10 is formed with a recess 27 which is interiorly threaded and is adapted to receive a plug member 28 provided with threads which coact with those of the recess. The plug member 28 is suitably recessed at 30 to accommodate a sliding plunger 31 which extends outside of the plug member 28 and is formed with a reduced portion 39 which extends through a passage 29 in the plug member 28 and is adapted to engage the ball valve 26. A valve seat member 32 is disposed at the end face of the plug 28 adjacent the valve chamber 14 and is held in position between the end face and an annular shoulder 33 formed in the body between the valve chamber 14 and the recess 27. The valve seat member 32 is provided with an opening 34 which permits the reduced portion 39 of the plunger 31 to extend therethrough. The plug 28 also has a passage 35 whereby, in coaction with a vertical passage 36, communication to the atmosphere may be established from the valve chamber 14 through the passage 29 and the opening 34.

The passage 17, at its end adjacent the second valve chamber 18, terminates in a valve seat 37, on which is adapted to seat a ball check valve 38 disposed in the chamber 18. A spring 40 is adapted to resiliently urge the ball check valve 38 toward the seat 37. The body 10 is suitably recessed at 41 to receive a plug member 42 which is formed with a recess to receive the spring 40.

The passage 17 also communicates through a passage 43 with a piston chamber 44 in the body 10, sealed from the outside by a plug 45. The piston chamber at its other end is in communication with the outlet port 12 through a connecting passage 46, and with the atmosphere through an exhaust passage 47 in the body 10.

An exhaust valve seat 48 is formed in the body 10 at the end of the piston chamber 44 adjacent the connecting passage 46 on which is adapted to seat an exhaust valve 50.

The exhaust valve 50 has a body or piston portion 51 which is provided with an annular, substantially U-sectioned gasket or packing ring 52 having a snug fit with respect to the piston chamber 44. A gasket retaining member 53 is secured about the body or piston portion 51 adjacent the gasket 52 and is held in place by a crimped over portion 54 of the body portion 51. The piston portion 51 is hollowed as at 55 to provide a vent for the back side of the valve 50.

At 56 is indicated a member for actuating the plunger 31 which may be part of actuating means separate from and not forming a part of the control device of the present invention.

When it is desired to permit fluid pressure medium to pass from a source thereof through the control device to a pressure operable servo-motor, or the like, the fluid pressure medium is released from its source and conducted to the inlet port 11 in any known manner. The member 56 is moved toward the left as viewed in Figure 1, to permit the pressure in the port 11 to unseat the inlet valve 22 from its seat 23. The consequent shifting of the valve body portion 24 toward the left, causes the ball valve 26 to abut the valve seat member 32 and thereby to cut off the communication of the valve chamber 14 with the atmosphere through the opening 34 and the passage 29 and the auxiliary exhaust passages 36 and 35.

The pressure medium entering the valve chamber 14, is directed to the connecting passage 16 and upon entering the passage 17 is divided. One portion thereof proceeds through the passage 43 into the piston chamber 44, where it acts on the exhaust valve piston 51 to urge the exhaust valve 50 onto its seat 48, and the other portion thereof proceeds towards the ball check valve 38. Since the spring urged ball check valve 38 prevents the progress of the fluid medium toward the outlet port 12 through passage 21 until the pressure in passage 17 is of sufficient magnitude to overcome the seating force of the spring 40, a time lag is introduced, which enables the fluid pressure medium to seat the exhaust valve 50 before the pressure medium gets past the ball check valve 38 and reaches the outlet port and the fluid pressure operable device connected thereto.

It will be noted that the area of the piston portion 51 is larger than the area of the exhaust valve 50 exposed to the action of fluid pressure through the connecting passage 46, so that the pressure in the chamber 44 is effective to maintain the exhaust valve on its seat in spite of any pressure that may be established in the passage 46. It will be apparent that the provision of the check valve 38 and the seating of the exhaust valve prior to the fluid pressure medium reaching the outlet port 12 and the servo-motor device connected thereto, is an important factor in increasing the operating efficiency of the control device. Unless the seating of the exhaust valve is correctly timed, the proper operation of the servo-motor device may not be achieved, as the operating fluid pressure may be dissipated through the exhaust passage 47.

When it is desirable to relieve the pressure in the servo-motor, the member 56 is operated to move the plunger 31 toward the right which in turn shifts the ball valve 36 and the inlet valve 22. This shift will cause the valve 22 to abut its seat 23 to prevent further admission of fluid medium from the inlet port 11, and will also effect unseating the ball valve 26 from the opening 34. The fluid medium in the exhaust piston chamber 44 is now enabled to escape therefrom to the atmosphere by way of the passages 43, 17, 16, the opening 34, and passages 29, 36 and 35. As soon as the pressure in the piston chamber 44 has sufficiently decreased, the pressure effective in the outlet port will unseat the exhaust valve 50, and thereby lead to a rapid exhaust of the fluid pressure medium in the servo-motor device, by way of the outlet port 12, the connecting passage 46, past the exhaust valve seat 48, and out through the exhaust passage 47.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

It is also to be understood that the following claim is intended to cover all the generic and specific features of the invention herein described, and all statements of the scope of the invention which, as a matter of language, might be said to fall therebetween.

We claim:

In combination, a valve housing having a plurality of bore portions including, in one position of the housing, a top series of communicating portions including in order from right to left an inlet, a valve chamber and an operating compartment opening from the housing, a series of communicating portions between the top and bottom of the housing including in order from right to left a spring receiving pocket, a check valve chamber and a dead end passage, a bottom series of communicating portions including in order from right to left an outlet, a piston valve cylinder and a cylinder entrance, ports joining said dead end passage to said valve chamber, to said piston valve cylinder and through said check valve chamber to said outlet, respectively, and an exhaust duct from said cylinder for residual fluid in said outlet; means in said compartment including a valve seat and a bushing having operating and piston vent passages; movable valve means in said valve chamber responsive to fluid pressure from said inlet for opening said inlet and seating against said valve seat; an operating member in said operating passage for said valve means for unseating the latter from said valve seat and closing said inlet passage; a check valve in said check valve chamber biased by a spring in said pocket to normally maintain the check valve chamber closed to said dead end passage; closure means for said pocket backing said spring; a piston valve unit in said cylinder; and closure means for said entrance.

HARRY C. GRANT, Jr.
WILLIAM A. V. THOMSEN.